United States Patent
Inokuchi et al.

(10) Patent No.: US 6,567,018 B2
(45) Date of Patent: May 20, 2003

(54) DATA RECORDING MEDIUM, CONTENTS DATA, RECORDING MEDIUM, DATA RECORDING METHOD AND APPARATUS, AND DATA REPRODUCING METHOD AND APPARATUS

(75) Inventors: Tatsuya Inokuchi, Kanagawa (JP); Tetsuji Kawashima, Kanagawa (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/069,092

(22) PCT Filed: Jun. 13, 2001

(86) PCT No.: PCT/JP01/05005
§ 371 (c)(1),
(2), (4) Date: Feb. 8, 2002

(87) PCT Pub. No.: WO01/97220
PCT Pub. Date: Dec. 20, 2001

(65) Prior Publication Data
US 2002/0113722 A1 Aug. 22, 2002

(30) Foreign Application Priority Data
Jun. 13, 2000 (JP) .......................... 2000-176593

(51) Int. Cl.$^7$ ................................................ H03M 7/00
(52) U.S. Cl. .......................................................... 341/50
(58) Field of Search ............................. 341/50, 67, 100, 341/99

(56) References Cited

U.S. PATENT DOCUMENTS 6,137,428 A * 10/2000 Cooper .......................... 341/50
6,483,446 B1 * 11/2002 Beach .......................... 341/50

* cited by examiner

Primary Examiner—Brian Young
(74) Attorney, Agent, or Firm—Jay H. Maioli

(57) ABSTRACT

A recording medium within which are recorded content data in which additional information including management information having a data length corresponding to a packet is embedded in a state where the content data are distributed to a plurality of packets, wherein the management information includes an information portion where information is rewritable and an information portion where information is not rewritable and an identifier for identifying the rewritable information portion and the nonrewritable information portion is provided for each of the information portions.

98 Claims, 10 Drawing Sheets

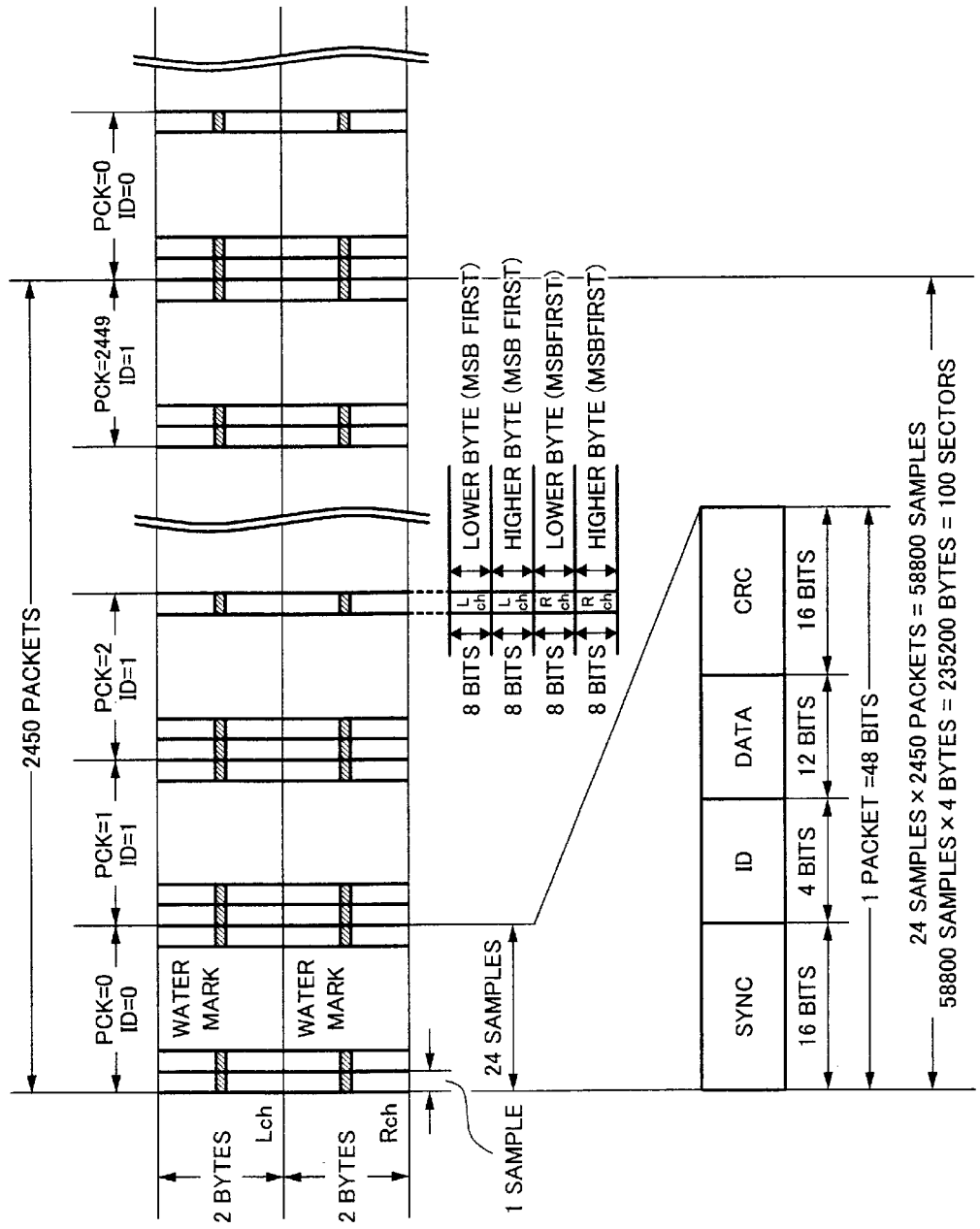

SYNC:5555(h)

| OMD | | SCMS | |
|---|---|---|---|
| 0 0 : | ROM (PRE-PRESS) | 0 0 : | ORIGINAL |
| 0 1 : | R | 0 1 : | COPY |
| 1 0 : | RW | 1 1 : | COPY FREE |
| 1 1 : | ANY(ROM/R/RW) | | | offset_Info = 2450 − PACKET NUMBER

DATA RECORDING MEDIUM, CONTENTS DATA, RECORDING MEDIUM, DATA RECORDING METHOD AND APPARATUS, AND DATA REPRODUCING METHOD AND APPARATUS

TECHNICAL FIELD

The invention relates to a data recording medium on which data of contents has been recorded, contents data, a recording medium, data recording method and apparatus, and data reproducing method and apparatus and, more particularly, to data protection of contents.

BACKGROUND ART

Development of a watermark such that copy management information is multiplexed to data of contents and embedded as additional information for the purpose of protecting a copyright when data of audio contents or video contents is recorded onto a recording medium is being progressed. A method of inserting the additional information to lower bits of a signal has been known as such a watermark.

For the purpose of protecting the copyright, in audio data, copy management information of an SCMS (Serial Copy Management System) is used as copy management information which is embedded as a watermark into contents. According to the copy management information of the SCMS, not only "copy free" and "copy inhibition" but also copy management over generations can be made.

A method whereby data of a watermark is embedded into lower bits of data of contents and the copy management information of the SCMS is recorded into the data of the watermark is considered.

In the SCMS, however, when the copy management over generations of the copy is made, it is necessary to rewrite the copy management information.

For example, the SCMS is shown by information of 2 bits. When the SCMS is equal to "00", the recording medium is an original medium and "copy of 1-generation is possible" is set. When it is equal to "01", the recording medium is a copied medium and a further copy is inhibited. When it is equal to "11", "copy free" is set. When the SCMS is equal to "00", in case of executing the copy, the SCMS is rewritten from "00" to "01" so that the "copy of 1-generation is possible" is set.

Such a rewriting process of the watermark becomes a larger burden than detection of the watermark.

Particularly, it is demanded that the copy management by the watermark is made by firmware so as to realize it by a program stored in an ROM (Read Only Memory) or an EEPROM (Electrically Erasable and Programable Read Only Memory) without using a dedicated integrated circuit. However, processing ability of the firmware is fairly small and, if the rewriting process of the watermark is executed by the firmware, such a process becomes a large burden.

It is, therefore, an object of the invention that in case of making management accompanied with rewriting of a watermark by using the watermark embedded in contents, a sufficient process can be executed even by firmware and necessary data can be accessed at a high speed.

DISCLOSURE OF INVENTION

According to the invention, there is provided a reproducing apparatus of a recording medium, comprising:

a head unit for scanning the recording medium in which additional information including management information has been distributed to a plurality of information units and embedded into data of contents;

a demodulation processing unit for executing a demodulating process of the data read out from the recording medium by the head unit;

a detection circuit unit for detecting the additional information from an output signal from the demodulation processing unit; and a discrimination circuit unit to which a detection result from the detection circuit unit is supplied and which discriminates the management information which has been distributed to the plurality of information units and recorded and, on the basis of the discriminated management information, controls a discrimination about whether the management information is rewritten when the output signal from the demodulation processing unit corresponding to at least the data of the contents read out from the recording medium is outputted or not.

According to the invention, there is provided a reproducing apparatus of a recording medium, comprising:

a head unit for scanning the recording medium in which additional information including management information having a data length corresponding to one packet has been distributed to a plurality of packets and embedded into data of contents;

a demodulation processing unit for executing a demodulating process of the data read out from the recording medium by the head unit;

a detection circuit unit for detecting the additional information from an output signal from the demodulation processing unit; and a discrimination circuit unit to which a detection result from the detection circuit unit is supplied and which discriminates the management information which has been distributed to the plurality of packets and recorded in a state where the management information as much as one packet has been collected and, on the basis of the discriminated management information, controls a discrimination about whether the management information is rewritten when the output signal from the demodulation processing unit corresponding to at least the data of the contents read out from the recording medium is outputted or not.

According to the invention, there is provided a reproducing apparatus of a recording medium, comprising:

a head unit for scanning the recording medium in which data of contents in which additional information including management information each having a data length corresponding to one packet has been embedded in a state where the additional information has been distributed to a plurality of packets has been recorded, wherein the management information includes an information portion where information is rewritable and an information portion where information is not rewritable and an identifier for identifying the rewritable information portion and the unrewritable information portion has been provided in each of the information portions;

a demodulation processing unit for executing a demodulating process of the data read out from the recording medium by the head unit;

a detection circuit unit for detecting the additional information from an output signal from the demodulation processing unit; and a discrimination circuit unit to which a detection result from the detection circuit unit is supplied and which discriminates the management information which has been distributed to the plurality of packets and recorded in a state where the management information as much as one packet has been collected and, on the basis of the discriminated management information, controls a discrimination about whether the management information is rewritten when the output signal from the demodulation processing unit corresponding to at least the data of the contents read out from the recording medium is outputted or not.

According to the invention, there is provided a reproducing method of a recording medium, comprising the steps of:

executing a demodulating process to data read out from the recording medium in which the data of the contents in which additional information including management information each having a data length corresponding to one packet has been embedded in a state where the additional information has been distributed to a plurality of packets has been recorded, wherein the management information includes an information portion where information is rewritable and an information portion where information is not rewritable and an identifier for identifying the rewritable information portion and the rewritable information portion has been provided in each of the information portions;

detecting the additional information from an output signal subjected to the demodulating process;

on the basis of a detection result, discriminating the management information which has been distributed to the plurality of packets and recorded in a state where the management information as much as one packet has been collected; and on the basis of the discriminated management information, determining whether the management information is rewritten when the output signal obtained by executing the demodulating process to at least the data of the contents read out from the recording medium is outputted or not.

According to the invention, there is provided a reproducing method of a recording medium, comprising the steps of:

executing a demodulating process to data read out from the recording medium in which the data of contents in which additional information including management information each having a data length corresponding to one packet has been embedded in a state where the additional information has been distributed to a plurality of packets has been recorded, wherein the management information includes an information portion where information is rewritable and an information portion where information is not rewritable and an identifier for identifying the rewritable information portion and the rewritable information portion has been provided in each of the information portions;

detecting the additional information from an output signal subjected to the demodulating process;

on the basis of a detection result, discriminating the management information which has been distributed to the plurality of packets and recorded in a state where the management information as much as one packet has been collected; and on the basis of the discriminated management information, determining whether the management information is rewritten when the output signal obtained by executing the demodulating process to at least the data of the contents read out from the recording medium is outputted or not.

According to the invention, there is provided a reproducing method of a recording medium, comprising the steps of:

executing a demodulating process to data read out from the recording medium in which additional information including management information has been distributed to a plurality of information units and embedded into data of contents;

detecting the additional information from an output signal subjected to the demodulating process; and on the basis of a result of the detection, discriminating the management information which has been distributed to the plurality of information units and recorded and, on the basis of the discriminated management information, determining whether the management information is rewritten when the output signal obtained by executing the demodulating process to at least the data of the contents read out from the recording medium is outputted or not.

According to the invention, there is provided a reproducing method of a recording medium, comprising the steps of:

executing a demodulating process to data read out from the recording medium in which additional information including management information has been distributed to a plurality of information units and embedded into data of contents;

detecting the additional information from an output signal subjected to the demodulating process; and on the basis of a result of the detection, discriminating the management information which has been distributed to the plurality of information units and recorded and, on the basis of the discriminated management information, determining whether the management information is rewritten when the output signal obtained by executing the demodulating process to at least the data of the contents read out from the recording medium is outputted or not.

According to the invention, there is provided a recording medium in which data of contents has been recorded, wherein additional information including management information including an information portion where information is rewritable and an information portion where information is not rewritable has been embedded in a state where the additional information has been distributed to a plurality of information units.

According to the invention, there is provided contents data in which additional information including management information having a data length corresponding to one information unit has been distributed to a plurality of information units and embedded into the data of the contents.

According to the invention, there is provided a recording apparatus of a recording medium, comprising:

a generating circuit unit for generating additional information on the basis of inputted data;

an adding circuit unit for adding the additional information from the generating circuit unit to data of inputted contents so as to be distributed to a plurality of information units;

a signal processing unit for performing a signal process for recording to an output from the adding circuit unit; and a head unit for recording an output from the signal processing unit into the recording medium.

According to the invention, there is provided a recording method of a recording medium, comprising the steps of:

generating additional information based on inputted data;

adding the generated additional information to data of inputted contents so as to be distributed to a plurality of information units;

performing a signal process for recording to the data of the contents to which the additional information has been added; and recording the signal-processed data into the recording medium.

BRIEF DESCRIPTION OF DRAWINGS

FIG. 1 is a schematic diagram for use in explanation of data of a watermark;

BEST MODE FOR CARRYING OUT THE INVENTION

Figure 2A:
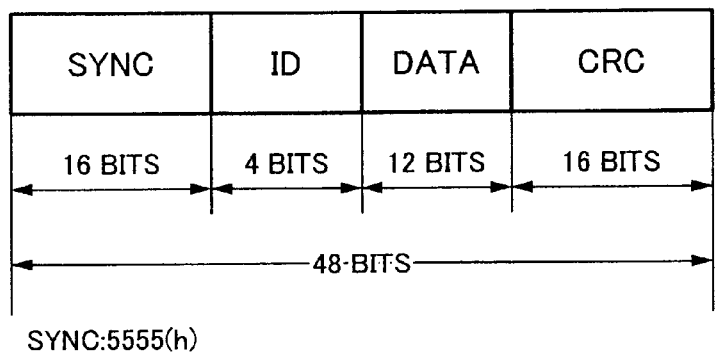
FIGS. 2A, 2B, and 2C are schematic diagrams for use in explanation of packets.

An embodiment of the invention will now be described hereinbelow with reference to the drawings. In the embodiment, when data of contents is recorded into a recording medium, data of a watermark is embedded into the data of the contents.

FIG. 1 shows a construction of a watermark which is embedded into data of contents. The data of the contents (audio data of the left (L) and right (R) channels here) is processed by two bytes (16 bits) per sample. Data (shown by a hatched portion in FIG. 1) of the watermark is embedded into the least significant bit of the data of the contents. Therefore, the data of the watermark is embedded at a ratio of 2 bits to the data of the contents of one sample of the left channel and one sample of the right channel (2 bytes+2 bytes=4 bytes).

The data of the watermark is processed by setting 48 bits to one information unit (packet). Since the data of the watermark is embedded at a ratio of 2 bits to the data of the contents of 4 bytes of one sample of the right and left channels, the data of the watermark of 1 packet (48 bits) is embedded to the data of the contents of 24 samples of the right and left channels (24 samples×4 bytes=96 bytes).

As will be explained hereinlater, as a packet consisting of 48 bits, there are a packet in which a payload is described and a packet indicative of a position of the packet of the payload. An identifier ID is provided so that the packet in which the payload is described and the packet indicative of the position of the packet of the payload can be identified. The identifier ID of the packet describing the payload is set to (ID=0). The identifier ID of the packet indicative of the position of the packet of the payload is set to (ID=1). In the example, a packet number PCK (PCK=0) indicates the packet in which the payload is described (the packet of ID=0). Packet numbers PCK (PCK=1 to 2449) indicate the packets each showing the position of the packet of the payload (the packets of ID=1). The packet describing the payload (the packet of ID=0) is arranged every 2450 packets. All of the packets between such packets are the packets each showing the position of the packet of the payload (the packets of ID=1).

As shown in FIG. 2A, the data of 1 packet (48 bits) which is inserted as a watermark is constructed by a sync of 16 bits, an identifier ID of 4 bits, data of 12 bits, and a CRC code of 16 bits.

The sync at the head of the packet is used for detecting the head of the packet and obtaining synchronization. This sync is set to a fixed pattern, for example, 5555h (h denotes a hexadecimal notation).

After the sync, the identifier ID for identifying a kind of packet is provided. As kinds of packets, there are a packet (FIG. 2B) for describing the payload and a packet (FIG. 2C) showing the position of the packet describing the payload. In case of the packet describing the payload, its identifier ID is set to (ID=0). In case of the packet showing the position of the packet describing the payload, its identifier ID is set to (ID=1).

In place of providing such an identifier ID, it is also possible to enable the packet (FIG. 2B) for describing the payload and the packet (FIG. 2C) showing the position of the packet describing the payload to be identified by the pattern of the sync. For example, it is also possible to set the sync pattern of one packet to 5555h and set the sync pattern of the other packet to 9999h.

As shown in FIG. 2A, the data is provided subsequently to the identifier ID for identifying the kind of packet. A construction of the data of the packet for describing the payload and that of the data of the packet showing the position of the packet describing the payload are different.

Figure 2B:
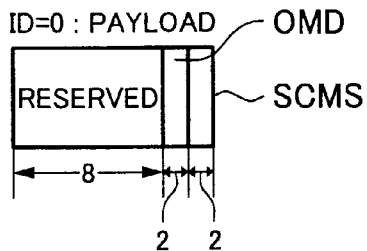

FIG. 2B shows the construction of the data in the packet describing the payload (the packet of ID=0). According to this packet, as shown in FIG. 2B, the payload is described as data of 12 bits.

The first 8 bits in the payload of 12 bits have been reserved.

The next 2 bits are used as an OMD (Original Media Descriminator) for identifying a kind of original recording medium. According to the OMD, for example, "00" indicates that the original medium is a read only medium (CD (Compact Disc) or CD-ROM (Read Only Memory)); "01" indicates that the original medium is a write once type recording medium (CD-R (Compact Disc Recordable)); "10" indicates that the original medium is a recordable/reproducible recording medium (CD-RW (Compact Disc Rewritable)); and "11" indicates that the original medium is an arbitrary disc.

On the basis of the OMD, for example, if the original recording medium is the actual recording medium, since the original medium is used, a charge is not made. If the original recording medium and the actual recording medium are different, since it is the copied recording medium, a charge is made and the medium is reproduced or the like, and the OMD can be used for management of the charge and reproduction.

The next 2 bits are used as SCMS (Serial Copy Management System) data for management of a copyright. If the SCMS data is, for example, equal to "00", the disc is the original disc and "copy of 1-generation is possible" is set. If it is equal to "01", the disc is the copied disc and "copy inhibition" is set. If it is equal to "11", "copy free" is set.

According to the SCMS, generation management of the copy is made by using the SCMS data as mentioned above. Therefore, the packet of (ID=0) describing the payload can be regarded as a packet with a possibility of necessity of rewriting.

Figure 2C:
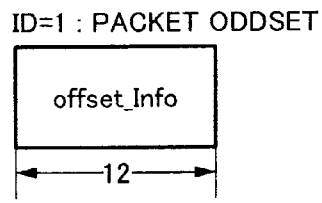

FIG. 2C shows a construction of the data in the packet showing the position of the packet of the payload (the packet of ID=1). In the packet showing the position of the packet of the payload, offset information (Offset_Info) showing a distance to the packet (the packet of ID=0) of the payload is described as data.

In this example, as shown in FIG. 1, the packet of (the packet of ID=0) describing the payload is arranged every 2450 packets. The packet of the packet number PCK is equal to (PCK=0) is the packet of (the packet of ID=0) describing the payload. The packets of the packet numbers PCK are equal to (PCK=1 to 2449) are the packets of (the packets of ID=1) each showing the position of the packet of the payload. Therefore, the offset information (Offset_Info) is shown as Offset_Info=2450—PCK PCK: packet number The packet (ID=0) describing the payload can be regarded as a packet in the case where it is necessary to rewrite. The packet (ID=1) showing the position of the packet of the payload can be regarded as a packet in which it is unnecessary to rewrite.

In FIG. 2A, the CRC code for error detection is added to the data of one packet. As a CRC code for error detection, $$G(x)=x^{16}+x^{15}+x^2+1$$

is used as a generating polynomial.

As mentioned above, the data of the watermark has been embedded into the data of the contents by setting 48 bits to one packet. 48 bits of one packet correspond to 24 samples (96 bytes) of the data of the contents. The packet for describing the payload (the packet of ID=0) is arranged every 2450 packets and the other packets (the packets of ID=1) are pointers each showing the position of the packet for describing the payload.

In case of decoding the data of the watermark, the data of the watermark embedded in the least significant bit of the data of the contents is extracted. That is, the data of one packet consisting of 48 bits is read.

The identifier ID is detected from the data of the watermark which was read and the kind of packet is discriminated.

If the detected identifier ID is equal to (ID=0), since this packet is the packet (FIG. 2B) for describing the payload, the process is executed on the basis of the description of the packet.

If the detected identifier ID is equal to (ID=1), since this packet is the packet (FIG. 2C) showing the position where the packet of the payload exists, the offset information (Offset_Info) is read. The packet existing at the position which is away from such a packet by a distance corresponding to the offset information (Offset_Info) is read. Since the packet existing at the position which is away from such a packet by a distance corresponding to the offset information (Offset_Info) is the packet (FIG. 2B) for describing the payload, the process is executed on the basis of the description of the packet.

Figure 3:
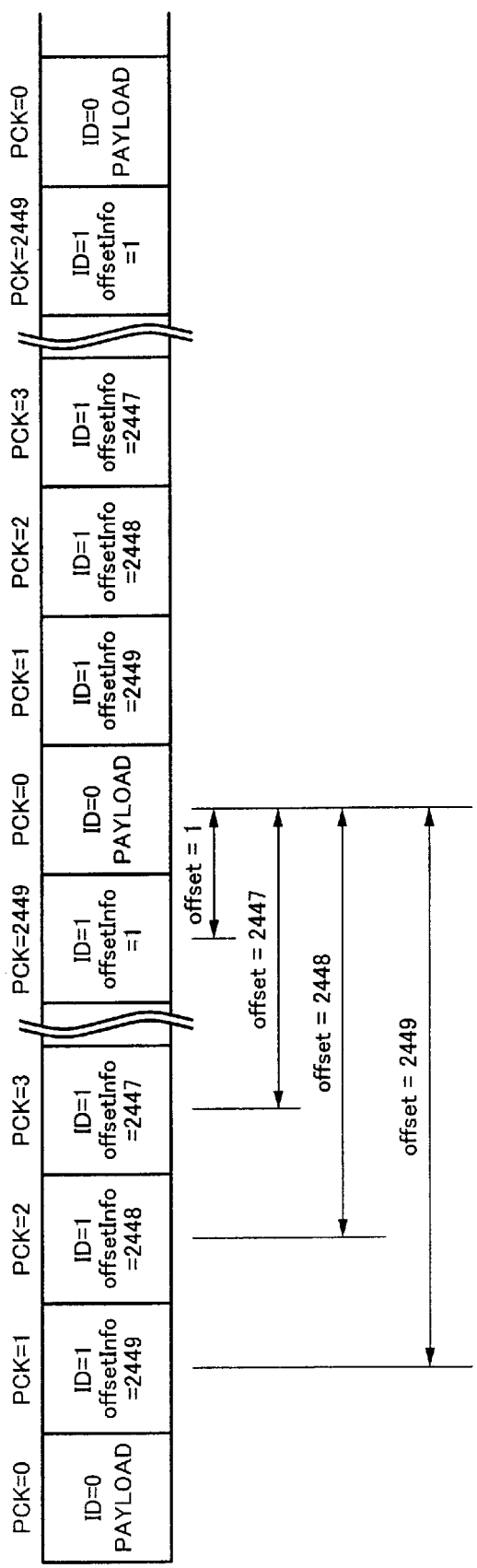
FIG. 3 is a schematic diagram for use in explanation of offset information.

That is, as shown in FIG. 3, the packet of the packet number PCK (PCK=0) is the packet for describing the payload. The identifier ID (ID=0) showing that the packet is the packet for describing the payload has been added to the packet of the packet number PCK (PCK=0). As a payload, the OMD for identifying the kind of original recording medium and the SCMS for copyright management have been recorded in such a packet.

The subsequent packets are the packets showing the position of the packet of the payload. The packet numbers PCK (PCK=1 to 2449) are sequentially added to those packets. The identifier ID (ID=1) is added to those packets and the offset information (Offset_Info) is written to those packets. The position of the packet (the packet of ID=0) of the payload can be found by the offset information (Offset_Info).

That is, as offset information (Offset_Info) up to the packet of the next payload, (2450−1=2449) is written in the packet of the packet number PCK (PCK=1). As offset information (Offset_Info) up to the packet of the next payload, (2450−2=2448) is written in the packet of the packet number PCK (PCK=2). As offset information (Offset_Info) up to the packet of the next payload, (2450−3=2447) is written in the packet of the packet number PCK (PCK=3).

Therefore, in case of the packet showing the position of the packet of the payload (the packet of ID=1), the packet describing the data of the payload (the packet of ID=0) exists at a position where an offset of only the offset information (Offset_Info) is added to the packet number PCK of this packet.

As mentioned above, in this example, the data of the watermark is embedded into the data of the contents by setting 48 bits to one packet, and one packet of 48 bits corresponds to 24 samples (96 bytes) of the data of the contents. The packet describing the payload (the packet of ID=0) is arranged every 2450 packets. The other packets are the packets each showing the position of the packet of the payload (the packets of ID=1). The packet in which it is necessary to rewrite is the packet describing the payload (the packet of ID=0). In case of the packet showing the position of the packet of the payload (the packet of ID=1), it is unnecessary to rewrite. Therefore, the packets which need the rewriting occur at a rate of 1 packet per 2450 packets.

2450 packets correspond to 24 samples×2450 packets=58800 samples

Since one sample consists of 4 bytes, 58800 samples×4 bytes=235200 bytes.

In the CD (Compact Disc), 98 frames are processed as one sector (subcode block). A capacity of one sector of the CD is equal to 2352 bytes. Therefore, with respect to the packet for describing the data of the payload (the packet of ID=0), one packet exists for every 100 sectors of the data of the contents.

Therefore, the fact that the packets which need the rewriting occur at a rate of 1 packet per 2450 packets means that it is sufficient that the process of one packet (48 bits) can be executed every 100 sectors. This process results in a process of 1 bit per about 2 sectors and it is possible to sufficiently cope with such a processing speed by firmware.

As mentioned above, according to the embodiment of the invention, the packets each describing the payload (the packets of ID=0) are provided at every intervals at which the process can be sufficiently executed by the firmware, and the packets arranged between those packets are the packets (ID=1) each showing the position of the packet of the payload. Therefore, the rewriting process of the payload can be sufficiently performed by the firmware. Since the packets arranged between the packets each describing the payload (the packets of ID=0) are the packets each showing the position of the packet of the payload (the packets of ID=1), the target immediately reaches the packet describing the payload (the packet of ID=0) and the process can be executed.

Although the packets each describing the payload (the packet of ID=0) have been arranged every 2450 packets here, this interval is not limited to such an example. The interval between the packets each describing the payload (the packets of ID=0) is determined in consideration of the time which can sufficiently cope with the rewrite processing time of the watermark.

Although the data of the watermark has been embedded into each sample of the data of the contents in the example of FIG. 1, there is no need to embed the data of the watermark into each sample of the data of all of the contents.

Figure 4:
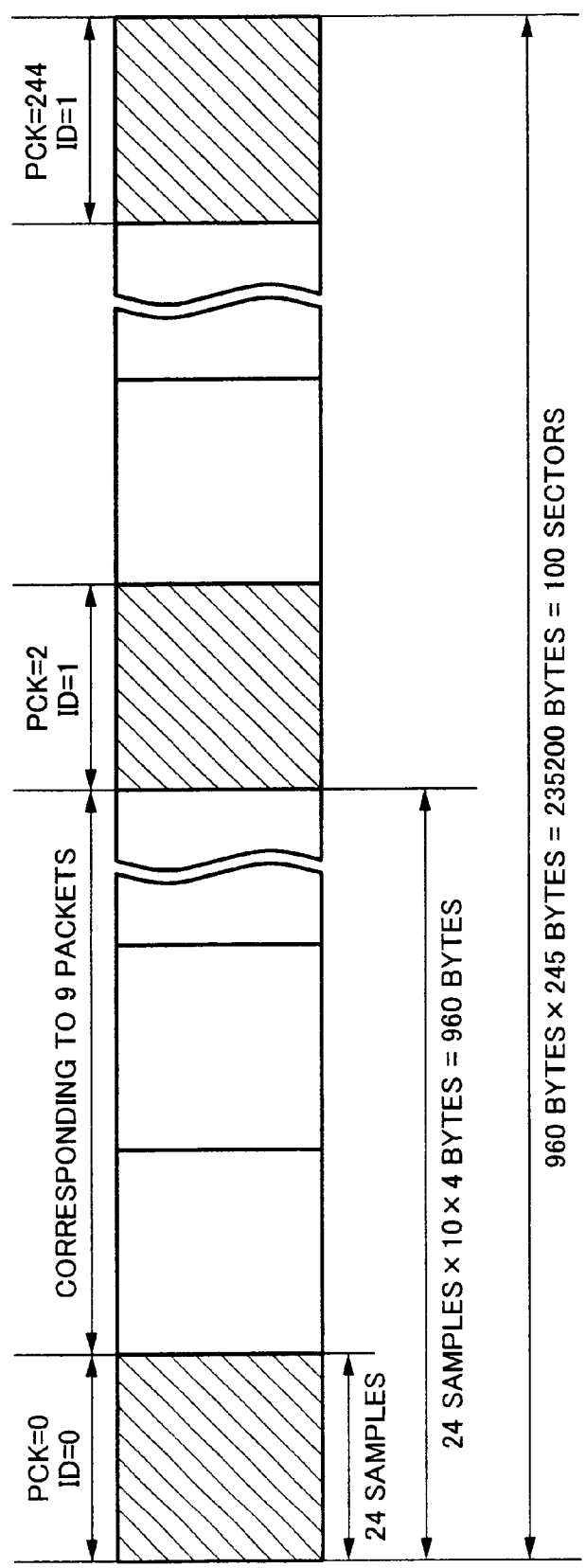
FIG. 4 is a schematic diagram for use in explanation of an arrangement of the watermark.

For example, as shown in FIG. 4, after the data of the watermark was embedded into the data of the contents of 24 samples corresponding to one packet, the data of the watermark is not embedded into each sample of the data of the contents corresponding to a few packets. In the example of FIG. 3, after the data of the watermark was embedded into the data of the contents of 24 samples corresponding to one packet, the data of the watermark is not embedded into each sample of the data of the contents corresponding to nine packets. In this case, the interval between the packets in each of which the watermark has been embedded corresponds to (24×10=240) samples in case of the data of the contents. Since 1 sample consists of 4 bytes, such an interval corresponds to 24 samples×10 packets×4 bytes=960 bytes In a manner similar to the foregoing example, assuming that the packets each describing the payload (the packets of ID=0) are provided at every interval corresponding to the data of the contents of 100 sectors, the packets each describing the payload (the packets of ID=0) are arranged every 245 packets. The packet numbers PCK are equal to (PCK=0 to 244).

By using such a method whereby after the data of the watermark was embedded into the data of the contents of 24 samples corresponding to one packet, no watermark is embedded into the data of the contents corresponding to a few packets, the number of samples of the data of the contents in which no watermark is embedded increases, so that the sound quality can be improved. That is, since the watermark is embedded into the data of the contents by using lower bits and, particularly, the fixed pattern is included in the data of the watermark, this fixed pattern is likely to appear as noises. When the number of samples of the data of the contents in which no watermark is embedded increases as mentioned above, the generation of such noises can be reduced.

When the number of samples in which no watermark is embedded increases as mentioned above, the number of packets each showing the position of the packet describing the payload (the packets of ID=1) decreases. Therefore, the time which is required until the target reaches the packet describing the payload (the packet of ID=0) becomes long. However, even if such a method is used, even in the worst case, in the interval between the packets each showing the position of the packet describing the payload (the packets of ID=1) (the interval of 100 sectors here), the packet showing the position of the packet describing the payload (the packet of ID=1) can be certainly detected and the target can reach the packet describing the payload (the packet of ID=0). Therefore, it is difficult to cause the substantial reduction of the processing time.

To which number of packets the interval of the portions where the data of the watermark is not embedded is set is determined in consideration of the processing time and the sound quality in the case where the contents data is audio data. In the case where the contents data is video data, it will be naturally understood that it is decided by the picture quality in place of the sound quality.

As mentioned above, by using the method whereby after the data of the watermark was embedded into the data of the contents of 24 samples corresponding to one packet, the data of the watermark is not embedded into each sample of the data of the contents corresponding to a few packets, the samples in which the data of the watermark is not embedded are generated between them. Another kind of watermark can be also embedded by using such a portion. As information which is included in the watermark that is embedded by using such a portion, there is charge information, key information for encryption, or the like.

In the above example, although the period during which the data of the watermark is not embedded has been set to the period corresponding to a predetermined number of packets, it is not always necessary to set such a period to be always identical. For example, the period during which the watermark is not embedded can be also set while changing it by a predetermined pattern like N packets, (N+2) packets, (N−2) packets, (N+4) packets, and (N−4) packets.

The period during which the data of the watermark is not embedded can be also set to random numbers by generating random numbers.

Assuming that the period during which the data of the watermark is not embedded is constant, there is a possibility that such components appear as noises. However, by fluctuating the period during which the data of the watermark is not embedded, the generation of such noise components can be prevented.

In the above example, the period during which the watermark is not embedded has been set by using the data of the contents of 24 samples corresponding to one packet to a unit.

However, it is not always necessary that the period during which the watermark is not embedded is set by using the data of the contents of 24 samples corresponding to one packet to a unit. For example, in case of inserting the data of the watermark into lower bits, since one sample becomes a unit by which the data of the watermark can be inserted, the sample can be also set as a unit.

For example, it is also possible to enable the data to be processed by using one sector (2352 bytes) of the data of the contents as a unit.

Figure 5:
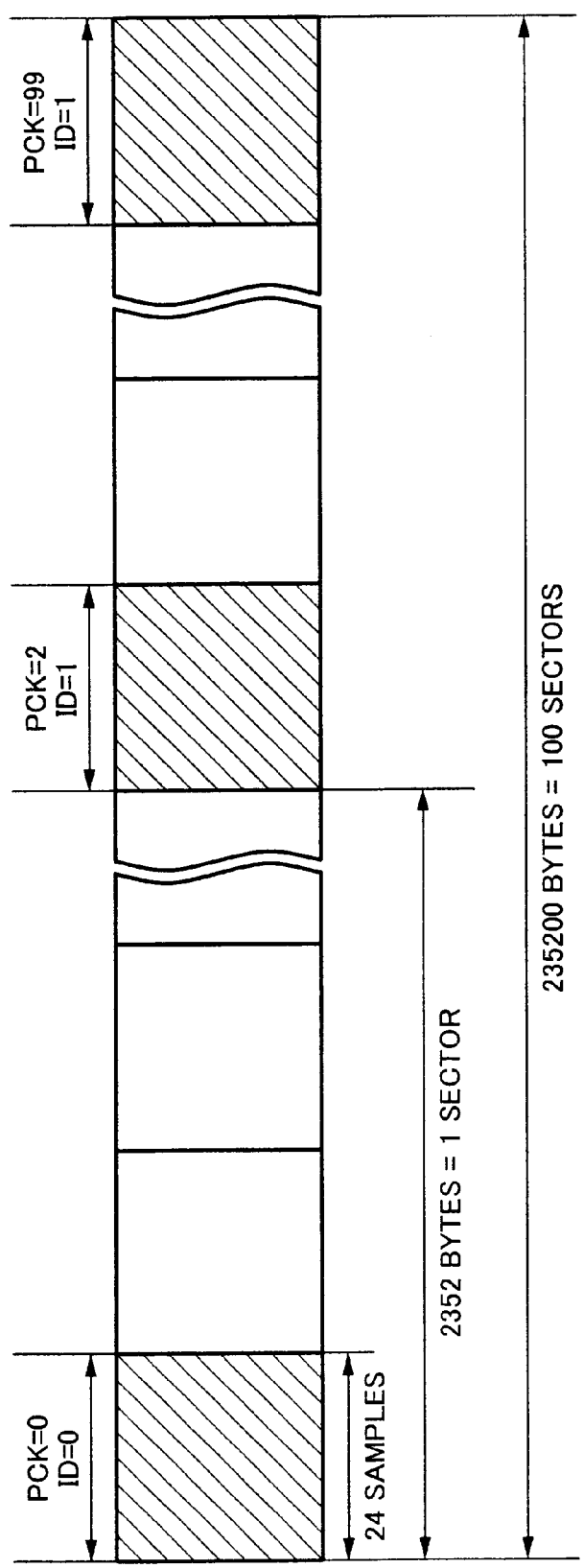
FIG. 5 is a schematic diagram for use in explanation of an arrangement of the watermark.

That is, FIG. 5 shows an example in the case where the interval of one packet is allowed to correspond to one sector. In this case, the interval of one packet corresponds to 2352 bytes (2352/96)=24.5 packets If the packet describing the payload (the packet of ID=0) is provided every position corresponding to the data of the contents of 100 sectors, the packet numbers PCK are set to (PCK=0 to 99).

By using the above method, the data of the watermark of one packet consisting of 48 bits is inserted. In this case, although the interval of the data of the watermark of one packet consisting of 48 bits is set to an interval of every 24.5 packets, it is not always necessary to insert the data of the watermark at regular intervals.

For example, a duration of the period during which no watermark is embedded can be also changed in accordance with a predetermined pattern in a manner such that the data of the watermark of one packet consisting of next 48 bits is first inserted to the position which is away by a distance of one sector, subsequently, the data of the watermark of one packet consisting of next 48 bits is first inserted to the position which is away by a distance of (1 sector+2 packets), and after that, the data of the watermark of one packet consisting of next 48 bits is inserted to the position which is away by a distance of (1 sector−2 packets) The duration of the period during which no watermark is embedded can be also changed at random.

A recording apparatus for recording data onto a recording medium by embedding the watermark into the data of the contents as mentioned above will now be described.

Figure 6:
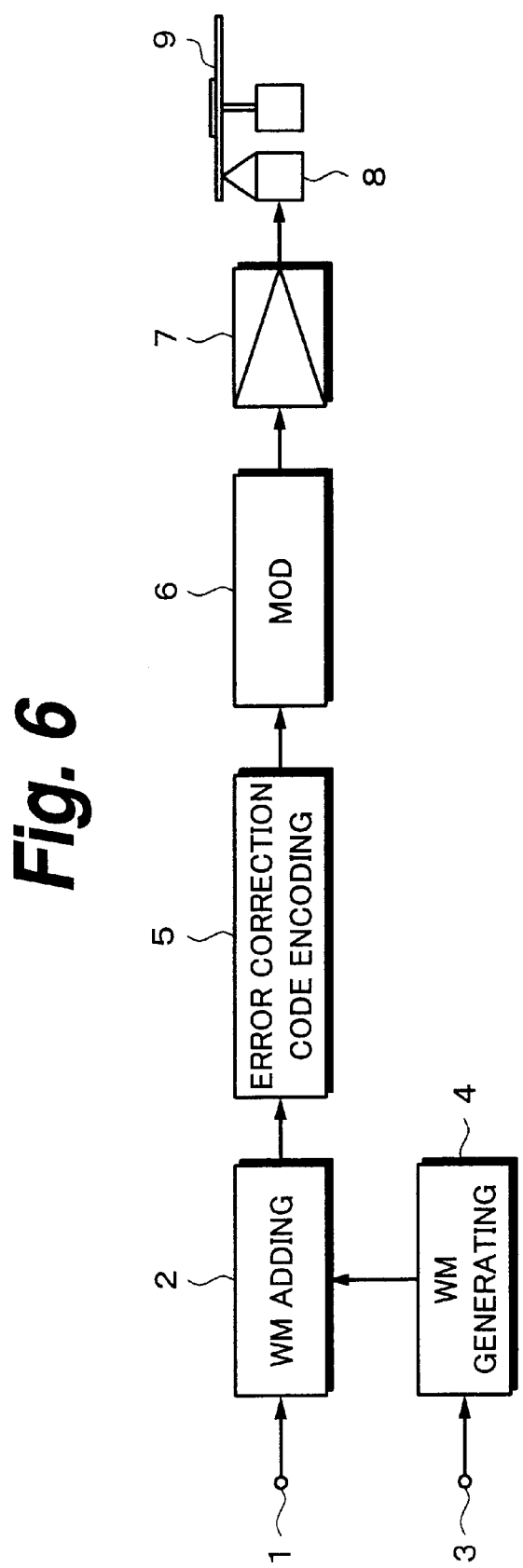
FIG. 6 is a block diagram of an example of a recording apparatus to which the invention is applied.

FIG. 6 shows an example of such a recording apparatus. In this example, a recordable optical disc (for example, CD-R optical disc or CD-RW optical disc) is used as a recording medium.

In FIG. 6, data of contents is supplied to an input terminal 1. The data of the contents is, for example, digital audio data which has been converted into digital data by 16 bits and comprises the right and left channels. The data of the contents is supplied from the input terminal 1 to a watermark adding circuit 2.

Data of a watermark is supplied to an input terminal 3. The data of the watermark is supplied to a watermark generating circuit 4. An output of the watermark generating circuit 4 is supplied to the watermark adding circuit 2.

By the watermark adding circuit 2, the data of the watermark from the watermark generating circuit 4 is embedded into the data of the contents from the input terminal 1. As mentioned above, the watermark is processed by using 48 bits as one packet. The packets describing the payload (the packets of ID=0) are provided, for example, every 2450 packets and, as packets between those packets, the packets each showing the position of the packet of the payload (the packets of ID=1) are provided. The watermark generating circuit 4 generates such two kinds of packets.

As a watermark, for example, a method of embedding the data of the watermark into lower bits of the data of the contents is used.

As other watermarks, the following watermarks have been known; that is, a watermark embedded by a method of inserting additional information into a high order coefficient upon compression; a watermark embedded by a method whereby a spectrum of the data of the watermark as additional information is distributed by using a spread spectrum and multiplexed to the data of the contents; a watermark embedded by a method of inserting the data of the watermark to a first or second peak in a predetermined range or to a position near the first or second peak; and the like. Naturally, another watermark can be also used.

To make the generation management of the copy by using the SCMS data, it is necessary to rewrite the watermark. When considering the rewriting of the watermark, it is considered to use the method of inserting the data of the watermark to lower bits of the data of the contents or the method of inserting the data of the watermark as additional information into the high order coefficient upon compression. According to the method whereby the spectrum of the data of the watermark as additional information is distributed by using the spread spectrum and multiplexed to the data of the contents or the method of inserting the data of the watermark to the first or second peak in the predetermined range or to a position near the first or second peak, the data of the watermark has to be added in accordance with the data of the contents, so that it is difficult to rewrite the watermark. A method of avoiding an influence on the contents by using a masking effect is considered.

The output of the watermark adding circuit 2 is supplied to an error correction encoding circuit 5. An error correcting process is executed in the error correction encoding circuit 5. An output of the error correction encoding circuit 5 is supplied to a modulating circuit 6 and subjected to a signal process for recording. An output of the modulating circuit 6 is supplied to an optical pickup 8 through a recording amplifier 7. The data of the contents in which the data of the watermark has been embedded is recorded onto an optical disc 9 by the optical pickup 8.

The optical disc on which the data of the contents has been recorded is usually sold or distributed as a read only disc such as CD or CD-ROM. In this case, the optical disc formed as mentioned above is used as a mother disc and the optical disc for sales or distribution is manufactured.

Figure 7:
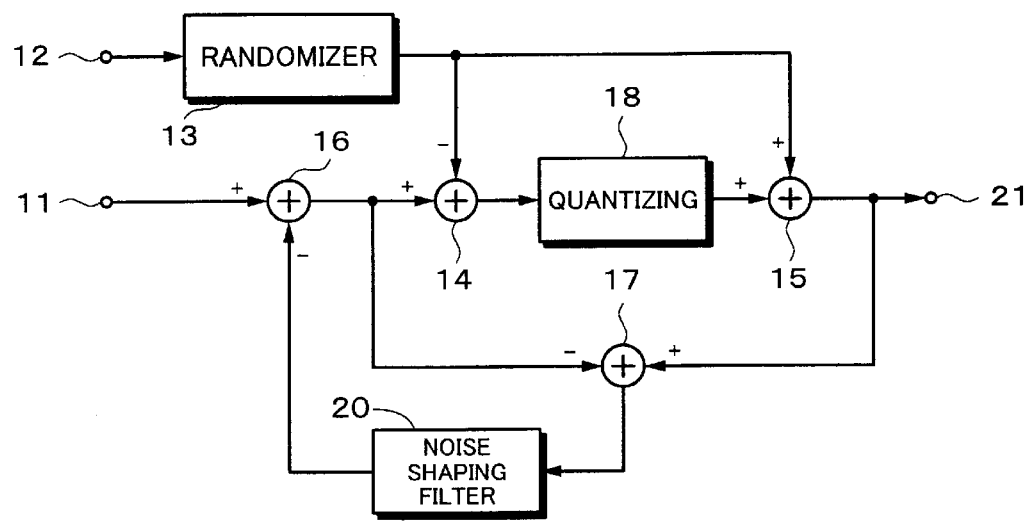
FIG. 7 is a block diagram of an example of a watermark encoder.

FIG. 7 shows an example of an encoder for inserting a watermark into data of contents. According to this example, information of the watermark is inserted to lower bits of the data of the contents. In the example shown in FIG. 7, components of the information of the watermark are inserted into a frequency band which is not auditorily influenced. Such an encoder can be used as a watermark adding circuit 2 in FIG. 6.

In FIG. 7, original data is supplied to an input terminal 11. Data of a watermark is supplied to an input terminal 12.

The data of the watermark from the input terminal 12 is supplied to a randomizer 13. The supplied data of the watermark is converted into white noises by the randomizer 13. An output of the randomizer 13 is supplied to a subtracting circuit 14 and supplied to an adding circuit 15.

The data from the input terminal 11 is supplied to a subtracting circuit 16. An output of the subtracting circuit 16 is supplied to the subtracting circuit 14 and supplied to a subtracting circuit 17. An output of the subtracting circuit 14 is supplied to a quantizing circuit 18. An output of the quantizing circuit 18 is supplied to the adding circuit 15.

The output of the quantizing circuit 18 and the output of the randomizer 13 are added by the adding circuit 15. The output of the adding circuit 15 is outputted from an output terminal 21 and supplied to the subtracting circuit 17. An output of the subtracting circuit 16 is subtracted from the output of the adding circuit 15 by the subtracting circuit 17.

An output of the subtracting circuit 17 is supplied to a noise shaping filter 20. An output of the noise shaping filter 20 is supplied to the subtracting circuit 16. An output of the noise shaping filter 20 is subtracted from the data from the input terminal 11 by the subtracting circuit 16.

The watermark encoder as shown in FIG. 7 inserts the data of the watermark into lower bits of the data of the contents. The noise components are inserted into a frequency band of the data of the contents where an auditory problem is not caused lest an influence which is caused by the insertion of the watermark is exercised on the data of the contents.

That is, in FIG. 7, the data from the input terminal 11 is quantized by the quantizing circuit 18. The data of the watermark from the randomizer 13 is inserted into lower bits of the data which is outputted from the quantizing circuit 18.

The subtracting circuit 14 is provided at the front stage of the quantizing circuit 18. The data of the watermark is subtracted from the data from the input terminal 11 by the subtracting circuit 14. As mentioned above, the data of the watermark is subtracted from the data from the input terminal 11 at the front stage of the quantizing circuit 18. Thus, the influence which is caused by the insertion of the data of the watermark into the data of the contents is eliminated by the adding circuit 15 at the post stage of the quantizing circuit 18.

The data to which the data of the watermark has been added is outputted from the adding circuit 15. The output of the adding circuit 15 is outputted from the output terminal 21. In addition to it, subtraction between the output data of the subtracting circuit 16 and the output of the adding circuit 15 is performed by the subtracting circuit 17. Subtraction between the output data from the quantizing circuit 18 and the input data to the quantizing circuit 18 is also performed by the subtracting circuit 17, so that the noise components accompanied by the quantization are extracted. The noise components are transferred by the noise shaping filter 20 to the position where an auditory problem is not caused and supplied to the subtracting circuit 16.

Figure 8:
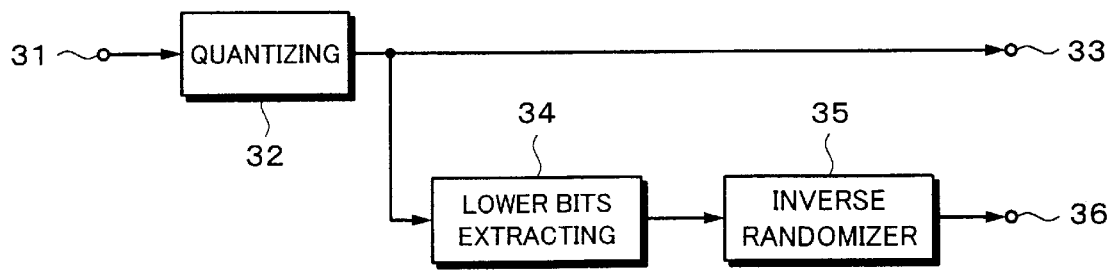
FIG. 8 is a block diagram of an example of a watermark decoder.

FIG. 8 shows an example of a decoder of a watermark for decoding the information of the watermark inserted as mentioned above.

In FIG. 8, the data of the contents to which the watermark has been multiplexed as mentioned above is supplied to an input terminal 31. The data from the input terminal 31 is supplied to a quantizing circuit 32. An output of the quantizing circuit 32 is outputted from an output terminal 33 and supplied to a lower bits extracting circuit 34.

The data of the watermark inserted to the lower bits of the data of the contents is extracted by the lower bits extracting circuit 34. The data of the watermark is supplied to an inverse randomizer 35.

The inverse randomizer 35 executes a process corresponding to that of the randomizer 13 in the encoder shown in FIG. 7 mentioned above. The randomized information of the watermark is returned to the original state by the inverse randomizer 35. The information of the watermark is obtained from the inverse randomizer 35. The information of the watermark is outputted from an output terminal 36.

Figure 9:
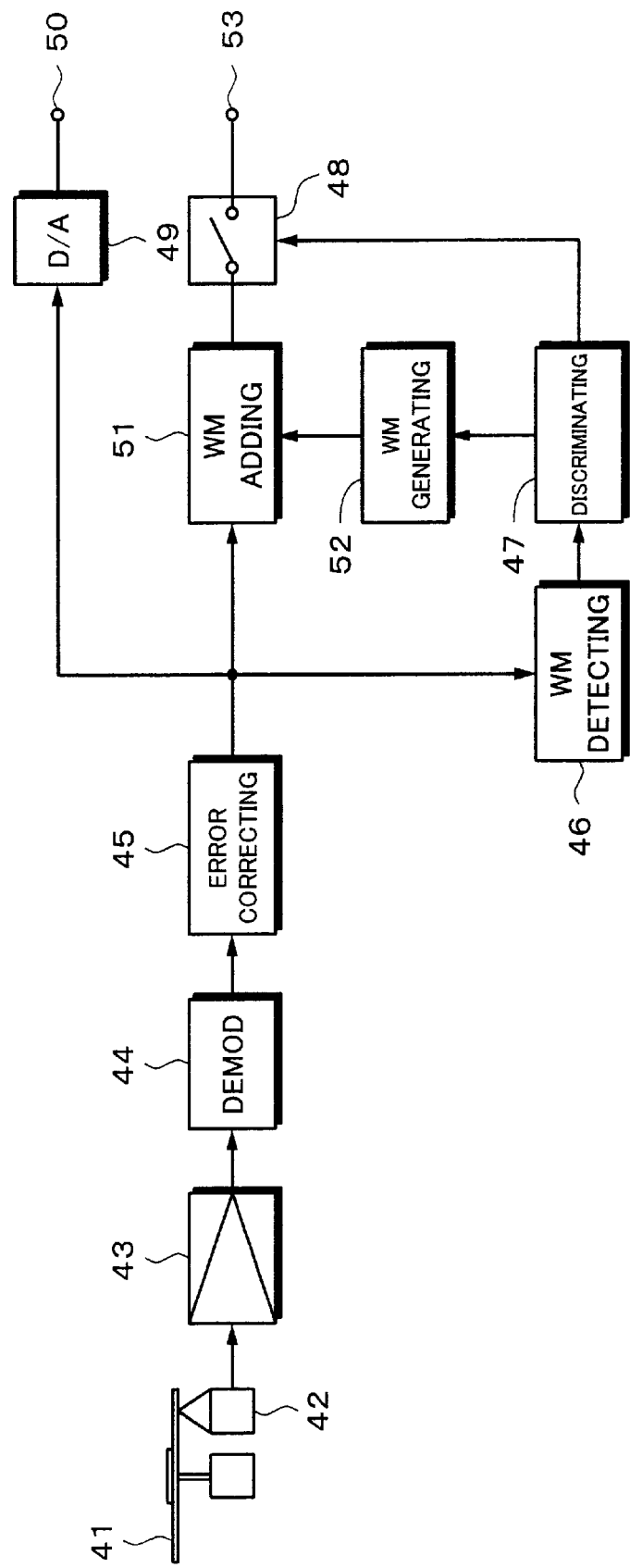
FIG. 9 is a block diagram of an example of a reproducing apparatus to which the invention is applied.

FIG. 9 shows an example of a reproducing apparatus. In FIG. 9, recording data on an optical disc 41 is read by an optical pickup 42. An output of the optical pickup 42 is supplied to a demodulating circuit 44 through a reproducing amplifier 43. An output of the demodulating circuit 44 is supplied to an error correcting circuit 45 and an error correcting process is executed by the error correcting circuit 45.

An output of the error correcting circuit 45 is supplied to a D/A converter 49. A digital signal outputted from the error correcting circuit 45 is converted into an analog signal by the D/A converter 49. An output of the D/A converter 49 is outputted from an output terminal 50.

The output of the error correcting circuit 45 is supplied to a watermark detecting circuit 46 and supplied to a watermark adding circuit 51. The data of the watermark is detected from the digital signal outputted from the error correcting circuit 45 by the watermark detecting circuit 46.

An output of the watermark detecting circuit 46 is supplied to a discriminating circuit 47. A switching circuit 48 is controlled on the basis of an output of the discriminating circuit 47 and the copying operation of the data of the contents is controlled.

The output of the error correcting circuit 45 is supplied to the watermark adding circuit 51. A watermark is formed by a watermark generating circuit 52 on the basis of the output of the discriminating circuit 47. This watermark is supplied from the watermark generating circuit 52 to a watermark adding circuit 51. In the case where it is necessary to rewrite the watermark, the rewriting process of the watermark is executed by the watermark adding circuit 51.

For example, if the watermark detected by the detecting circuit 46 indicates "copy of 1-generation is possible", a watermark showing "copy inhibition" is formed by the generating circuit 52 and embedded into the output signal from the error correcting circuit 45 by the adding circuit 51, and the watermark is rewritten.

An output of the watermark adding circuit 51 is supplied to a data output terminal 53 through the switching circuit 48.

For example, if an external recording apparatus is connected to the output terminal 53, the copying operation of the data of the contents is controlled by the watermark added by the generating circuit 52.

The data of the watermark has been embedded in the data of the contents recorded on the optical disc 41. The data of the watermark is detected by the watermark detecting circuit 46. A circuit with a construction shown in FIG. 8 can be used as a watermark detecting circuit 46.

As mentioned above, the watermark is processed by setting 48 bits to one packet. The packet describing the payload (the packet of ID=0) is arranged, for example, every 2450 packets. The packets between such packets are the packets each showing the position of the packet of the payload (the packets of ID=1).

In the discriminating circuit 47, the data of one packet consisting of 48 bits is read, the identifier ID is detected from the read data of the watermark, and the kind of packet is discriminated. If the detected identifier ID is equal to (ID=0), since this packet is the packet for describing the payload, a copy restricting process is executed on the basis of the description of the payload of the packet. If the detected identifier ID is equal to (ID=1), the offset information (Offset_Info) is read and the packet of the payload existing at the position which is away by a distance of the offset information (Offset_Info) is read. The copy restricting process of the data of the contents read out from the optical disc 41 is executed on the basis of the description of the payload of this packet.

Figure 10:
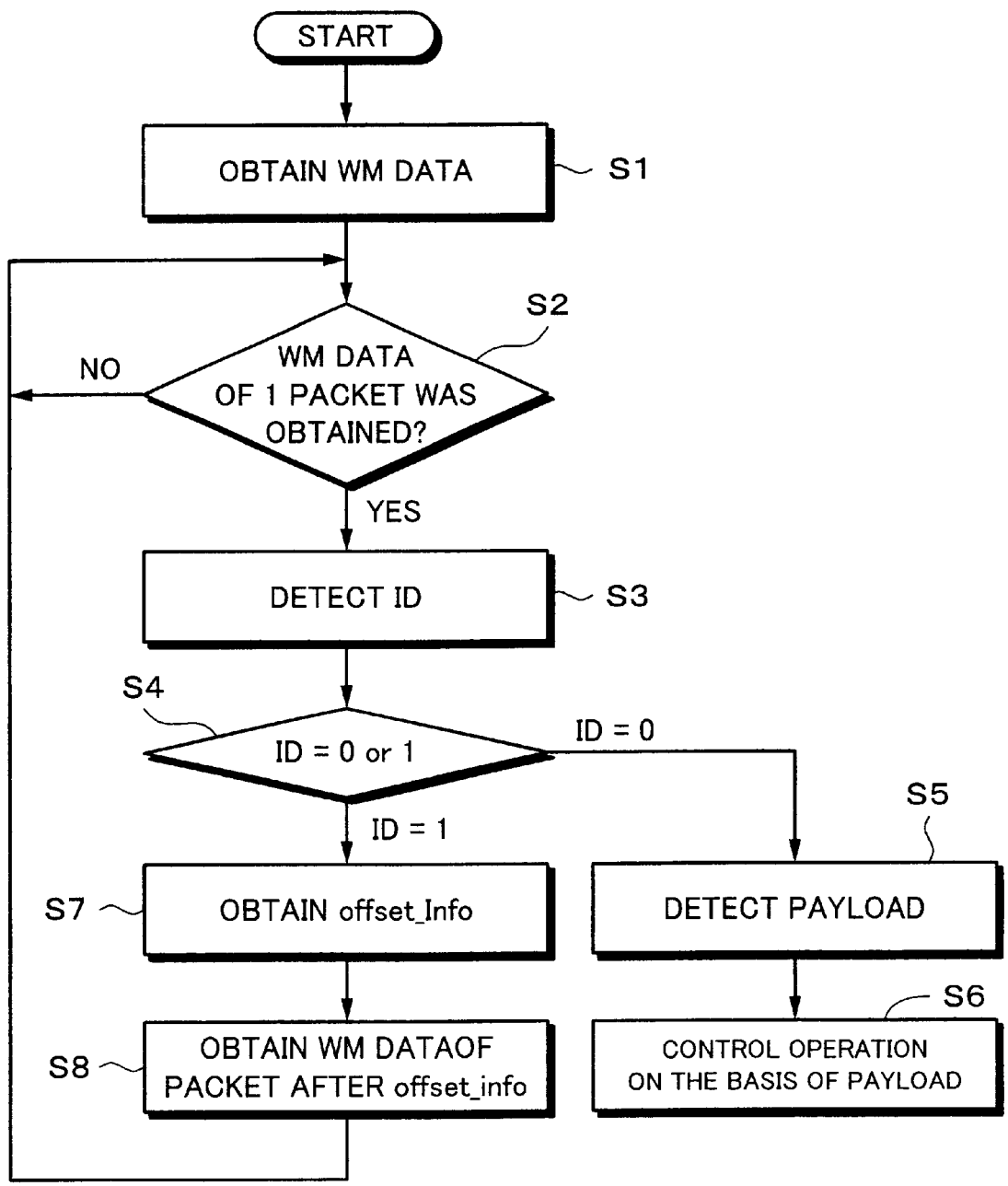
FIG. 10 is a flowchart for use in explanation of a reproducing process of the watermark.

That is, FIG. 10 is a flowchart showing the process in the discriminating circuit 47. In FIG. 10, if the data of the watermark is obtained (step S1), whether the data of the watermark corresponding to one packet (48 bits) has been collected or not is discriminated (step S2) If the data of the watermark corresponding to one packet has been collected, the identifier ID is detected (step S3). Whether the identifier ID is equal to (ID=0) or (ID=1) is discriminated (step S4). If the identifier ID is equal to (ID=0), since this packet is the packet describing the payload, this payload is detected (step S5). The operation of copy management or the like is controlled on the basis of this payload (step S6).

If the identifier ID is equal to (ID=1) in step S4, since this packet is the packet showing the position of the packet of the payload, the offset information (Offset_Info) is read (step S7). The data of the watermark of the packet existing at the position which is away by a distance of the offset information (Offset_Info) is obtained (step S8).

The processing routine is returned to step S2 and whether the data of the watermark corresponding to one packet (48 bits) has been collected or not is discriminated. If the data of the watermark corresponding to one packet has been collected, the identifier ID is detected (step S3)

If the data of the watermark of the packet existing at the position which is away by the distance of the offset information (Offset_Info) is obtained on the basis of the offset information (Offset_Info) obtained in step S7, this packet is the packet of the payload, and the identifier ID is supposed to be (ID=0).

Whether the identifier ID is equal to (ID=0) or (ID=1) is discriminated in step S4. If it is determined that the identifier ID is equal to (ID=0), the payload is detected in step S5. The operation of copy management or the like is controlled on the basis of this payload in step S6.

If the identifier ID is equal to (ID=1) in step S4, the offset information (Offset_Info) is read in step S7. The data of the watermark of the packet existing at the position which is away by a distance of the offset information (Offset_Info) is obtained in step S8. The processing routine is returned to step S2.

Figure 11:
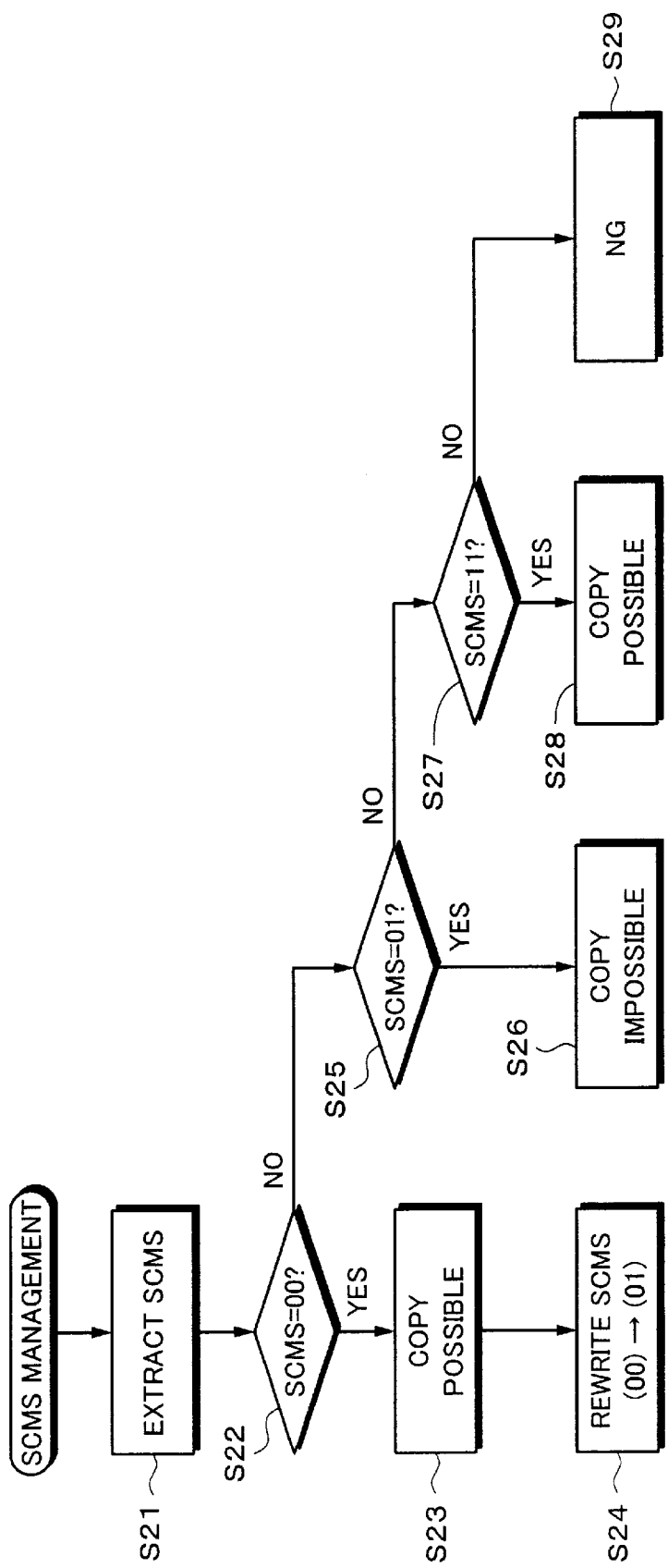
FIG. 11 is a flowchart for use in explanation of an example of management by an SCMS.

FIG. 11 is a flowchart showing copy management using the data of the SCMS in the operation control (step S6 in FIG. 10) based on the payload.

The data of the SCMS is management information of the copy over generations. When the data of the SCMS is equal to "00", this means that the optical disc 41 as a recording medium is the original medium. In this case, "copy of 1-generation is possible" is set. In case of copying the data of the contents read out from the optical disc 41, the data of the SCMS is rewritten from "00" to "01". When the data of the SCMS is equal to "01", this means that the optical disc 41 as a recording medium is the copied medium and the further copy of the data of the contents is inhibited. When the data of the SCMS is equal to "11", the data of the contents is set to "copy free".

In FIG. 11, the data of the SCMS is extracted from the portion of the payload of the packet of (ID=0) (step S21).

Whether the data of the SCMS is equal to (SCMS=00) or not is discriminated (step S22). If the data of the SCMS is equal to (SCMS=00), since the optical disc 41 as a recording medium is the original recording medium, the switching circuit 48 in FIG. 9 is turned on, and a "copy is possible" state of the data of the contents read out from the optical disc 41 is set (step S23). The packet of (ID=0) is rewritten so as to change the data of the SCMS from "00" to "01" by the data of the watermark from the watermark generating circuit 52. Thus, the data read out from the optical disc as a recording medium is controlled so as to be set to "copy of 1-generation is possible".

If it is determined in step S22 that the data of the SCMS is not equal to (SCMS=00), whether the data of the SCMS is equal to (SCMS=01) or not is discriminated (step S25). If the data of the SCMS is equal to (SCMS=01), since the optical disc is the copied recording medium, the switching circuit 48 is turned off and a "copy is impossible" state is set (step S26).

If it is determined in step S25 that the data of the SCMS is not equal to (SCMS=01), whether the data of the SCMS is equal to (SCMS=11) or not is discriminated (step S27). If the data of the SCMS is equal to (SCMS=11), since this means that the data of the contents is "copy free", the switching circuit 48 is turned on and the "copy is possible" state is set (step S28).

If it is determined in step S27 that the data of the SCMS is not equal to (SCMS=11), since the data of the SCMS is impossible data of the SCMS, a discrimination result is regarded to be NG and the process is performed. In this case, a process for inhibiting the copy or ignoring the data of the SCMS is executed.

In the invention, the packet describing the payload (the packet of ID=0) is arranged at every interval at which the process can be sufficiently performed by firmware. The packets between such packets are the packets each showing the position of the packet of the payload (ID=1). The packets between the packets each describing the payload (the packets of ID=0) are the packets each showing the position of the packet of the payload (the packets of ID=1). Therefore, the packet describing the payload (the packet of ID=0) is detected and the process can be immediately performed.

For example, assuming that the data of the watermark is embedded into the data of the contents by setting 48 bits to one packet, one packet of 48 bits corresponds to 24 samples (96 bytes) of the data of the contents. For example, the packet describing the payload (the packet of ID=0) is provided every 2450 packets and the other packets are set to the packets each showing the position of the packet of the payload (the packets of ID=1). The packet which needs to be rewritten is the packet describing the payload (the packet of ID=0). In case of the packet showing the position of the packet of the payload (the packet of ID=1), the rewriting is unnecessary.

In this case, for example, the packets which need to be rewritten are generated at a rate of one packet per 2450 packets. It is sufficient that the process of one packet (48 bits) per 100 sectors can be executed. It is possible to sufficiently cope with such a processing speed by firmware.

What is claimed is:

1. A reproducing apparatus of a recording medium, said apparatus comprising:

a head unit for scanning said recording medium within which additional information including management information is distributed to a plurality of information units and embedded into content data;

a demodulation processing unit for executing a demodulating process of said content data read from said recording medium by said head unit;

a detection circuit unit for detecting said additional information from an output signal from said demodulation processing unit; and a discrimination circuit unit to which a detection result from said detection circuit unit is supplied and that discriminates said management information distributed to said plurality of information units and recorded and that controls a discrimination regarding whether said management information is rewritten when said output signal from said demodulation processing unit corresponding to at least said content data read from said recording medium is outputted based on said discriminated management data.

2. The reproducing apparatus according to claim 1, further comprising a rewriting unit that is controlled by said discrimination circuit unit and that rewrites said management information in said output signal from said demodulation processing unit.

3. The reproducing apparatus according to claim 2, wherein said rewriting unit includes: a generating unit for generating new management information based on a control signal from said discrimination circuit unit; and an adding circuit unit for adding said generated management information to said output signal from said demodulation processing unit.

4. The reproducing apparatus according to claim 2, wherein: said management information includes an information portion where information is rewritable by said rewriting unit and an information portion where information is not rewritable by said rewriting unit; an identifier for identifying said rewritable information portion and said nonrewritable information portion is added to each of said portions; and said management information is distributed to said plurality of information units.

5. The reproducing apparatus according to claim 4, wherein said discrimination circuit unit discriminates whether said management information detected by said detection circuit unit is in one of said rewritable information portion and said nonrewritable information portion based on said identifier; and when a result of said discrimination determines that said management information is said rewritable information portion an outputting operation of said content data read from said recording medium is controlled based on a management condition shown by said rewritable information portion.

6. The reproducing apparatus according to claim 5, wherein when said management condition shown by said rewritable information portion permits a copy of said content data read from said recording medium said discrimination circuit unit permits said output of said output signal from said demodulation processing unit and allows said rewritable information portion to be rewritten by said rewriting unit.

7. The reproducing apparatus according to claim 6, wherein said discrimination circuit unit allows said rewritable information portion to be rewritten by said rewriting unit to inhibit said copying of data read from said recording medium.

8. The reproducing apparatus according to claim 6, wherein when said management condition shown by said rewritable information portion inhibits said copying of said content data read from said recording medium said discrimination circuit unit inhibits said output of said output signal from said demodulation processing unit.

9. The reproducing apparatus according to claim 5, wherein as a result of said discrimination based on said identifier when said management information is said nonrewritable information portion said discrimination unit circuit allows said additional information including said management information embedded at a position on said recording medium shown by said nonrewritable information portion to be read from said recording medium and controls said outputting operation of said content data read from said recording medium based on said management condition shown by said read management information.

10. A reproducing apparatus for a recording medium, comprising:
a head unit for scanning said recording medium within which additional information including management information having a data length corresponding to a packet has been distributed to a plurality of packets and embedded into content data;
a demodulation processing unit for executing a demodulating process of said content data read from said recording medium by said head unit;
a detection circuit unit for detecting said additional information from an output signal from said demodulation processing unit; and
a discrimination circuit unit to which a detection result from said detection circuit unit is supplied and that discriminates said management information distributed to said plurality of packets and recorded in a state where said management information equivalent to said one packet has been collected and controls a discrimination regarding whether said management information is rewritten when said output signal from said demodulation processing unit corresponding to at least said content data read from said recording medium is outputted based on said discriminated management information.

11. The reproducing apparatus according to claim 10, further comprising a rewriting unit that is controlled by said discrimination circuit unit and that rewrites said management information in said output signal from said demodulation processing unit.

12. The reproducing apparatus according to claim 11, wherein said rewriting unit includes: a generating unit for generating new management information based on a control signal from said discrimination circuit unit; and an adding circuit unit for adding said generated management information to said output signal from said demodulation processing unit.

13. The reproducing apparatus according to claim 11, wherein: said management information includes an information portion where information is rewritable by said rewriting unit and an information portion where information is not rewritable by said rewriting unit; an identifier for identifying said rewritable information portion and said nonrewritable information portion is added to each of said information portions; and said management information is distributed to said plurality of packets.

14. The reproducing apparatus according to claim 13, wherein: said discrimination circuit unit discriminates whether said management information detected by said detection circuit unit is one of said rewritable information portion and said nonrewritable information portion based on said identifier; and when it is determined as a result of said discrimination that said management information is said rewritable information portion said outputting operation of said content data read from said recording medium is controlled based on a management condition shown by said rewritable information portion.

15. The reproducing apparatus according to claim 14, wherein when said management condition shown by said rewritable information portion permits copying of said content data read from said recording medium said discrimination circuit unit permits said output of said output signal from said demodulation processing unit and allows said rewritable information portion to be rewritten by said rewriting unit.

16. The reproducing apparatus according to claim 15, wherein said discrimination circuit unit allows said rewritable information portion to be rewritten by said rewriting unit so as to inhibit said copying of said content data read from said recording medium.

17. The reproducing apparatus according to claim 15, wherein when said management condition shown by said rewritable information portion inhibits said copying of said content data read from said recording medium said discrimination circuit inhibits said output of said output signal from said demodulation processing unit.

18. The reproducing apparatus according to claim 14, wherein: as a result of said discrimination based on said identifier when said management information is said nonrewritable information portion said discrimination circuit allows said additional information including said management information embedded at a position on said recording medium shown by said nonrewritable information portion to be read from said recording medium; and controls said outputting operation of said content data read from said recording medium based on said management condition shown by said read management information.

19. A reproducing apparatus for a recording medium, comprising:
a head unit for scanning said recording medium within which are recorded content data in which additional information including management information having a data length corresponding to a packet has been embedded in a state where said additional information has been distributed to a plurality of packets, wherein said management information includes an information portion where information is rewritable and an information portion where information is not rewritable and an identifier for identifying said rewritable information portion and said nonrewritable information portion has been provided in each of said information portions;

a demodulation processing unit for executing a demodulating process of said content data read from said recording medium by said head unit;

a detection circuit unit for detecting said additional information from an output signal from said demodulation processing unit; and a discrimination circuit unit to which a detection result from said detection circuit unit is supplied and that discriminates said management information distributed to said plurality of packets and recorded in a state where said management information equivalent to said packet has been collected and controls a discrimination regarding whether said management information is rewritten when said output signal from said demodulation processing unit corresponding to at least said content data read from said recording medium is outputted based on said discriminated management information.

20. The reproducing apparatus according to claim 19, further comprising a rewriting unit that is controlled by said discrimination circuit unit and that rewrites said management information in said output signal from said demodulation processing unit.

21. The reproducing apparatus according to claim 20, wherein said rewriting unit includes: a generating unit for generating new management information based on a control signal from said discrimination circuit unit; and an adding circuit unit for adding said newly generated management information to said output signal from said demodulation processing unit.

22. The reproducing apparatus according to claim 19, wherein said discrimination circuit unit discriminates whether said management information detected by said detection circuit unit is said rewritable information portion or said nonrewritable information portion based in said identifier, and when it is determined as a result of said discrimination that said management information is said rewritable information portion an outputting operation of said content data read from said recording medium is controlled based on a management condition shown by said rewritable information portion.

23. The reproducing apparatus according to claim 22, wherein when said management condition shown by said rewritable information portion permits a copying of said content data read from said recording medium said discrimination circuit unit permits said output of said output signal from said demodulation processing unit and allows said rewritable information portion to be rewritten by said rewriting unit.

24. The reproducing apparatus according to claim 23, wherein said discrimination circuit unit allows said rewritable information portion to be rewritten by said rewriting unit so as to inhibit said copying of said content data read from said recording medium.

25. The reproducing apparatus according to claim 23, wherein when said management condition shown by said rewritable information portion inhibits said copying of said content data read from said recording medium said discrimination circuit unit inhibits said output of said output signal from said demodulation processing unit.

26. The reproducing apparatus according to claim 22, wherein as a result of said discrimination based on said identifier when said management information is said nonrewritable information portion said discrimination circuit unit allows said additional information including said management information embedded at a position on said recording medium shown by said nonrewritable information portion to be read from said recording medium and controls said outputting operation of said content data read from said recording medium based on said management condition shown by said read management information.

27. A reproducing method for a recording medium, comprising the steps of:

executing a demodulating process on data read from said recording medium within which content data in which additional information including management information having a data length corresponding to a packet has been embedded in a state where said additional information has been distributed to a plurality of packets has been recorded, wherein said management information includes an information portion where information is rewritable and an information portion where information is not rewritable and an identifier for identifying said rewritable information portion and said nonrewritable information portion has been provided in each of said information portions;

detecting said additional information from an output signal subjected to said demodulating process;

discriminating said management information distributed to said plurality of packets and recorded in a state where said management information equivalent to one said packet has been collected based on a result of said detection; and determining whether said management information is rewritten when said output signal obtained by executing said demodulating process to at least said content data read from said recording medium is outputted based on said discriminated management information.

28. The reproducing method according to claim 27, wherein: whether said detected management information is one of said rewritable information portion and said nonrewritable information portion is discriminated based on said identifier; and when it is determined as a result of said discrimination that said management information is said rewritable information portion an outputting operation of said content data read from said recording medium is controlled based on a management condition shown by said rewritable information portion.

29. The reproducing method according to claim 28, wherein when said management condition shown by said rewritable information portion permits copying of said content data read from said recording medium an output of said demodulation-processed output signal is permitted and said rewritable information portion is rewritten by said rewriting unit.

30. The reproducing method according to claim 29, wherein said rewritable information portion is rewritten by said rewriting unit so as to inhibit said copying of said content data read from said recording medium.

31. The reproducing method according to claim 29, wherein when said management condition shown by said rewritable information portion inhibits said copying of said content data read from said recording medium said output of said demodulation-processed output signal is inhibited.

32. The reproducing method according to claim 28, wherein as a result of said discrimination based on said identifier when said management information is said nonrewritable information said additional information including said management information embedded at a position on said recording medium shown by said nonrewritable information portion is read from said recording medium and said outputting operation of said content data read from said recording medium is controlled based on said management condition shown by said read management information.

33. A reproducing method for a recording medium, comprising the steps of:
performing a demodulating process of data read from said recording medium in which additional information including management information having a data length corresponding to a packet has been distributed to a plurality of packets and embedded into content data;
detecting said additional information from an output signal subjected to said demodulating process;
discriminating said management information which has been distributed to said plurality of packets and recorded in a state where said management information equivalent to one said packet has been collected based on a result of said detection; and
determining whether said management information is rewritten when said demodulation-processed output signal of at least said content data read from said recording medium is outputted based on said discriminated management information.

34. The reproducing method according to claim 33, wherein said management information includes an information portion where information is rewritable, an information portion where information is not rewritable, and an identifier for identifying said rewritable information portion and said nonrewritable information portion has been added to each of said information portions and distributed to said plurality of packets.

35. The reproducing method according to claim 34, wherein whether said management information detected by said detection circuit unit is one of said rewritable information portion and said nonrewritable information portion is discriminated based on said identifier, and when it is determined as a result of said discrimination that said management information is said rewritable information portion an outputting operation of said content data read from said recording medium is controlled based on a management condition shown by said rewritable information portion.

36. The reproducing method according to claim 35, wherein when said management condition shown by said rewritable information portion permits copying of said content data read from said recording medium said discrimination circuit unit permits an output of said demodulation-processed output signal and rewrites said rewritable information portion.

37. The reproducing method according to claim 36, wherein said rewritable information portion is rewritten so as to inhibit said copying of said content data read from said recording medium.

38. The reproducing method according to claim 36, wherein when said management condition shown by said rewritable information portion inhibits said copying of said content data read from said recording medium said output of said demodulation-processed output signal is inhibited.

39. The reproducing method according to claim 35, wherein as a result of said discrimination based on said identifier when said management information is said nonrewritable information portion said additional information including said management information embedded at a position on said recording medium shown by said nonrewritable information portion is read from said recording medium and said outputting operation of said content data read from said recording medium is controlled based on said management condition shown by said read management information.

40. A reproducing method for a recording medium, comprising the steps of:
executing a demodulating process to data read from said recording medium in which additional information including management information has been distributed to a plurality of information units and embedded into content data;
detecting said additional information from an output signal subjected to said demodulating process; and
discriminating said management information that has been distributed to said plurality of information units and recorded based on a result of said detection and determining whether said management information is rewritten when said output signal obtained by executing said demodulating process to at least said content data read from said recording medium is outputted based on said discriminated management information.

41. The reproducing method according to claim 40, wherein said management information includes an information portion where information is rewritable, an information portion where information is not rewritable, and an identifier for identifying whether said rewritable information portion and said nonrewritable information portion has been added to each of said information portions and distributed to said plurality of information units.

42. The reproducing method according to claim 41, wherein whether said management information detected by said detection circuit unit is one of said rewritable information portion and said nonrewritable information portion is discriminated based on said identifier and when it is determined as a result of said discrimination that said management information is said rewritable information portion an outputting operation of said content data read from said recording medium is controlled based on a management condition shown by said rewritable information portion.

43. The reproducing method according to claim 42, wherein when said management condition shown by said rewritable information portion permits copying of said content data read from said recording medium said output of said demodulation-processed output signal is permitted and said rewritable information portion is rewritten.

44. The reproducing method according to claim 43, wherein said rewritable information portion is rewritten so as to inhibit said copying of said content data read from said recording medium.

45. The reproducing method according to claim 43, wherein when said management condition shown by said rewritable information portion inhibits said copying of said content data read from said recording medium said output of said demodulation-processed output signal is inhibited.

46. The reproducing method according to claim 42, wherein as a result of said discrimination based on said identifier when said management information is said nonrewritable information portion said additional information including said management information embedded at a position on said recording medium shown by said nonrewritable information portion is read out from said recording medium and said outputting operation of said content data read from said recording medium is controlled based on said management condition shown by said read management information.

47. A recording medium within which content data in which additional information including management information having a data length corresponding to a packet has been embedded in a state where said additional information has been distributed to a plurality of packets are recorded, wherein said management information includes an information portion where information is rewritable and an information portion where information is not rewritable and an identifier for identifying whether said rewritable information portion and said nonrewritable information portion have been provided in each of said information portions.

48. The recording medium according to claim 47, wherein information showing a position of said packet in which said additional information was recorded has been recorded in said information portion where said information is not rewritable.

49. A recording medium according to claim 47, wherein said plurality of packets in within which said nonrewritable information portion has been embedded exist between a packet within which said rewritable information portion has been embedded and a next packet within which said rewritable information portion has been embedded.

50. The recording medium according to claim 49, wherein said packet within which said rewritable information portion has been embedded and said next packet within which said rewritable information portion has been embedded are separated by a distance large enough to rewrite said rewritable information portion where said information is rewritable.

51. The recording medium according to claim 47, wherein said additional information is spread-spectrum diffused and multiplexed into said content data.

52. The recording medium according to claim 47, wherein said additional information is inserted into lower bits of said content data.

53. The recording medium according to claim 47, wherein said additional information is inserted to a high order coefficient when said content data are compressed.

54. The recording medium according to claim 47, wherein said additional information is inserted so that an influence on said content data is prevented by using a masking effect.

55. The recording medium according to claim 47, wherein said additional information is inserted into one of a first peak and a second peak in a predetermined range of said content data and a position near one of said first peak and second peak.

56. The recording medium according to claim 47, wherein said additional information includes at least copy management information for copy management of said content data.

57. A recording medium within which content data are recorded, wherein additional information including management information including an information portion within which information is rewritable and an information portion within which information is not rewritable has been embedded in a state where said additional information has been distributed to a plurality of information units.

58. The recording medium according to claim 57, wherein an identifier for identifying said rewritable information portion and said nonrewritable information portion is further provided for each of said plurality of information portions.

59. The recording medium according to claim 57, wherein information showing a position of an information unit within which said additional information was recorded is recorded in said nonrewritable information portion.

60. The recording medium according to claim 57, wherein a plurality of information units within each of which said nonrewritable information portion is embedded exists between said information unit within which said rewritable information portion has been embedded and a next information unit within which said rewritable information portion has been embedded.

61. The recording medium according to claim 60, wherein said information unit within which said rewritable information portion has been embedded and said next information unit within which said rewritable information portion has been embedded are separated by a distance large enough to rewrite said rewritable information portion.

62. The recording medium to claim 58, wherein said additional information is spread-spectrum diffused and multiplexed into said content data.

63. The recording medium according to claim 57, wherein said additional information is inserted to lower bits of said content data.

64. The recording medium according to claim 57, wherein said additional information is inserted to a high order coefficient at a time when said content data are compressed.

65. The recording medium according to claim 57, wherein said additional information is inserted so that an influence on said content data is prevented by using a masking effect.

66. The recording medium according to claim 57, wherein said additional information is inserted to one of a first peak, a second peak in a predetermined range of said content data, and to a position near one of said first and second peak.

67. The recording medium according to claim 57, wherein said additional information includes at least copy management information for copy management of said content data.

68. Content data in which additional information including management information having a data length corresponding to one information unit is distributed to a plurality of said information units and embedded into said content data.

69. The content data according to claim 68, wherein said management information includes an information portion within which information is rewritable and an information portion within which information is not rewritable and an identifier for identifying said information portion within which information is rewritable and said nonrewritable information portion is provided for each of said plurality of information portions.

70. The content data according to claim 69, wherein information showing a position of an information unit in which said additional information is recorded is recorded in said nonrewritable information portion.

71. The content data according to claim 69, wherein a plurality of information units within each of which said nonrewritable information portion has been embedded exist between said information unit in which said rewritable information portion is embedded and a next information unit within which said rewritable information portion is embedded.

72. The content data according to claim 71, wherein said information unit within which said rewritable information portion is embedded and said next information unit in which said rewritable information portion is embedded are separated by a distance large enough to rewrite said rewritable information portion.

73. The content data according to claim 68, wherein said additional information is spread-spectrum diffused and multiplexed into said content data.

74. The content data according to claim 68, wherein said additional information is inserted to lower bits of said content data.

75. The content data according to claim 68, wherein said additional information is inserted to a high order coefficient when said content data are compressed.

76. The content data according to claim 68, wherein said additional information is inserted such that an influence on said content data is prevented by using a masking effect.

77. The content data according to claim 68, wherein said additional information is inserted into one of a first peak in a predetermined range of said content data, a second peak in said predetermined range of said content data, and a position near one of said first and said second peak.

78. The content data according to claim 68, wherein said additional information includes at least copy management information for copy management of said content data.

79. A recording apparatus of a recording medium, comprising:
   a generating circuit unit for generating additional information based on inputted data;
   an adding circuit unit for adding said additional information from said generating circuit unit to inputted content data so as to be distributed to a plurality of information units;
   a signal processing unit for performing a signal process for recording to an output from said adding circuit unit; and a head unit for recording said output from said signal processing unit into said recording medium.

80. The recording apparatus according to claim 79, wherein said additional information includes an information portion within which information is rewritable and an information portion within which information is not rewritable and an identifier for identifying said rewritable information portion and said nonrewritable information portion is provided for each of said information portions.

81. The recording apparatus according to claim 80, wherein information showing a position where said information unit in which said additional information is recorded is recorded in said nonrewritable information portion.

82. The recording apparatus according to claim 80, wherein said information unit within which said rewritable information portion is embedded and a next information unit in which said rewritable information portion is embedded are separated by a distance large enough to rewrite said rewritable information portion.

83. The recording apparatus according to claim 79, wherein said additional information is spread-spectrum diffused and multiplexed into said content data.

84. The recording apparatus according to claim 79, wherein said additional information is inserted to lower bits of said content data.

85. The recording apparatus according to claim 79, wherein said additional information is inserted to a high order coefficient when said content data are compressed.

86. The recording apparatus according to claim 79, wherein said additional information is inserted such that an influence on said content data is prevented by using a masking effect.

87. The recording apparatus according to claim 79, wherein said additional information is inserted into one of a first peak in a predetermined range of said content data, a second peak in said predetermined range of said content data, and a position near one of said first and said second peak.

88. The recording apparatus according to claim 79, wherein said additional information includes at least copy management information for copy management of said content data.

89. A recording method of a recording medium, comprising the steps of:
   generating additional information based on inputted data;
   adding said generated additional information to inputted content data so as to be distributed to a plurality of information units;
   performing a signal process for recording to said content data to which said additional information has been added; and
   recording said signal-processed data into said recording medium.

90. The recording method according to claim 89, wherein said additional information includes an information portion within which information is rewritable and an information portion within which information is not rewritable and an identifier for identifying said rewritable information portion and said nonrewritable information portion is provided for each of said information portions.

91. The recording method according to claim 90, wherein information showing a position of where said information unit within which said additional information is recorded is recorded in said nonrewritable information portion.

92. The recording method according to claim 90, wherein said information unit within which said rewritable information portion is embedded and a next information unit within which said rewritable information portion is embedded are separated by a distance large enough to rewrite said rewritable information portion.

93. The recording method according to claim 89, wherein said additional information is spread-spectrum diffused and multiplexed into said content data.

94. The recording method according to claim 89, wherein said additional information is inserted to lower bits of said content data.

95. The recording method according to claim 89, wherein said additional information is inserted to a high order coefficient when said content data are compressed.

96. The recording method according to claim 89, wherein said additional information is inserted such that an influence on said content data is prevented by using a masking effect.

97. The recording method according to claim 89, wherein said additional information is inserted into a first peak in a predetermined range of said content data, a second peak in said predetermined range of said content data, and a position near one of said first and said second peak.

98. The recording method according to claim 89, wherein said additional information includes at least copy management information for copy management of said content data.

* * * * *